(12) United States Patent
Sato

(10) Patent No.: US 6,748,300 B2
(45) Date of Patent: Jun. 8, 2004

(54) METHOD OF DETERMINING PERMISSIBLE SPEED OF AN OBJECT AND CONTROLLING THE OBJECT

(75) Inventor: Tomonori Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/281,124

(22) Filed: Oct. 28, 2002

(65) Prior Publication Data

US 2003/0216822 A1 Nov. 20, 2003

(30) Foreign Application Priority Data

May 15, 2002 (JP) ........................................ 2002-140047

(51) Int. Cl.[7] ............................................. G05D 13/00
(52) U.S. Cl. ........................ 700/304; 700/181; 83/312; 83/313
(58) Field of Search ................................. 700/181, 304, 700/174; 83/312–313, 263

(56) References Cited

U.S. PATENT DOCUMENTS

| | | | | |
|---|---|---|---|---|
| 5,200,680 A | * | 4/1993 | Sasaki et al. ................ | 318/571 |
| 5,331,264 A | * | 7/1994 | Cheng et al. ........... | 318/568.11 |
| 5,892,345 A | * | 4/1999 | Olsen .......................... | 318/571 |
| 5,943,634 A | * | 8/1999 | Piety et al. ..................... | 702/56 |
| 6,085,121 A | * | 7/2000 | Stern ........................... | 700/175 |
| 6,597,968 B2 | * | 7/2003 | Matsumoto et al. ......... | 700/188 |

FOREIGN PATENT DOCUMENTS

| | | |
|---|---|---|
| JP | 2-72414 | 3/1990 |
| JP | 2-219107 | 8/1990 |
| JP | 2001-51708 | 2/2001 |

OTHER PUBLICATIONS

Benjamin C. Kuo, "Automatic Control Systems", 7th Edition, 1995, pp. 544, 545, 607, 717, and 721.

* cited by examiner

*Primary Examiner*—Leo Picard
*Assistant Examiner*—Alexander Kosowski
(74) *Attorney, Agent, or Firm*—Leydig, Voit & Mayer, Ltd.

(57) ABSTRACT

Command path and command speed within a predetermined range are read. The predetermined range is time required for the object to move between two points on the command path. Speed command for each time is temporarily generated based on the read command path and the command speed. Frequency component that corresponds to mechanical vibration due to movement of the object and that is included in a speed command for the each time is calculated. Speed at which the frequency component becomes equal to or smaller than a preset reference value is determined as the permissible speed. Moving speed of the object is controlled so as not to exceed the calculated permissible speed.

16 Claims, 15 Drawing Sheets k : NUMBER OF TIMES OF REPETITION

METHOD OF DETERMINING PERMISSIBLE SPEED OF AN OBJECT AND CONTROLLING THE OBJECT

BACKGROUND OF THE INVENTION

1) Field of the Invention

The present invention relates to determining a speed at which an object is allowed to move (permissible speed) and controlling the speed of the object such that the speed does not exceed the permissible speed.

2) Description of the Related Art

Determination of permissible speed of an object, and control of the speed of the object such that the speed does not exceed the permissible speed are performed in everyday life. Such technology is employed in numerical control apparatuses, robot control apparatuses, sequencers, and devices that control movement of elevators, sewing machines, coordinate measuring machines, plotters, belt conveyers, automobiles, trains, and aircrafts.

Generally, if the object is moving at a high speed then more mechanical vibrations are generated than when the object is moving at a lower speed. If there are more mechanical vibrations then the precision of the operation of the object decreases. Therefore, it is desirable to determine a speed of the object at which the mechanical vibrations are in an allowable range and control the speed of movement of the object such that the speed does not exceed the permissible speed. The precision of the operation of the object can be maintained at a higher level if such control is provided.

A conventional method for determining the permissible speed of the object will now be explained. Such a method has been disclosed in Japanese Patent Application Laid-Open No. H2-219107 entitled "Numerical Control Apparatus". According to the method disclosed in this patent application, a moving trajectory is set at a path on which an object sequentially passes through a plurality of target points P(1), P(2), . . . and P(n), where n is a natural number. Then the permissible speed is calculated based on segment data X(k) in a portion K starting from an arbitrary point P(k) and ending P(k+1) on this path and a maximum speed command value F0, where k is a natural number having a value that is equal to or less than n. The permissible speed is equal to or lower than a permissible normal speed which is determined in accordance with the curvature of the portion K is obtained based on segment data on the portion K, segment data on intervals in the vicinity of the interval, and the maximum speed command value F0.

Another conventional method of this type has been disclosed in Japanese Patent Application laid-Open No. H2-72414 entitled "Feed Speed Control Method for Numerical Control". According to the method disclosed in this patent application, the permissible speed is determined based on the speed difference between two adjacent blocks. That is, a maximum speed change, which is determined in accordance with a maximum motor torque or a shock applied to a machine, is obtained in advance. A workpiece is machined at a maximum cutting speed which is independently set. If a speed change for each axis in a corner exceeds the maximum speed change, a maximum feed speed which does not exceed the maximum speed change is obtained.

The conventional methods have following disadvantage. That is, if the acceleration or speed difference is suppressed so as not to be greater than the permissible value, mechanical vibration may be indirectly decreased. However, recently the speed of movement is increasing day by day to reduce the duration of the movement. It has been found that the conventional method cannot sufficiently suppress mechanical vibration when the speed of movement is high.

This disadvantage will be explained while taking the method of Japanese Patent Application Laid-Open No. H2-219107 as an example. To always prevent mechanical vibration, permissible acceleration is set sufficiently low. According to this method, however, if mechanical vibration is not generated even though permissible acceleration is set high, speed is unnecessarily decreased, with the result that working efficiency is disadvantageously deteriorated.

The conventional disadvantage will be explained concretely with reference to FIG. 15 to FIG. 19. An instance when an object operates in accordance with a command path and a command speed as shown in FIG. 15 will first be explained. Reference symbols P0, P1, and P2 denote start and end points of two segments that constitute the command path. The object moves on the command path from point P0 to P1, and then from point P1 to P2. Reference symbol F1000 show near each segment denotes the command speed (mm/min).

When the object moves at the command speed, for example, speed differences which occur at the point P1 are expressed as follows:

X-axis: $1000\times(\cos(\pi/2)-\cos(-\pi/2))=0$

Y-axis: $1000\times(\sin(\pi 2)-\sin(-\pi/2))=1000\sqrt{2}$.

If permissible speed differences on the X and Y axes are both set at $300\sqrt{2}$, the permissible speed of the object at the point P1 is expressed as follows:

$1000\times 300\sqrt{2}/1000\sqrt{2}=300$.

FIG. 16 shows vibrations generated in a machine if the object passes through or near the point P1 at a speed of 300. More specifically, FIG. 16 shows an acceleration waveform on the Y axis. Since acceleration on the X axis is 0, waveform on the X axis will not be explained. The resonance frequency of the machine is set at 20 Hz and the damping ratio thereof is set at 0.1. In this case, generated mechanical vibration is a maximum of 0.78 m/s$^2$.

An instance when the object operates in accordance with a command path and a command speed as shown in FIG. 17 will next be explained. In FIG. 17, reference symbols P0 to P3 denote start/endpoints of respective segments which constitute the command path. The object moves on the command path in the order of P0, P1, P2 and P3. Although the points P1 and P2 are seen to overlap each other, they are actually apart by 10 μm (see FIG. 18).

If the object passes at the command speed, for example, speed differences which occur at the point P1 are expressed as follows:

X-axis: $1000\times(\cos(\pi/2)-\cos(0))=1000\times(\sqrt{2}/2-1)$

Y-axis: $1000\times(\sin(\pi/2)-\sin(0))=1000\times(\sqrt{2}/2)$.

If permissible speed differences on the X and Y axes are both set at $300\sqrt{12}$, the permissible speed of an object at the point P1 is expressed as follows:

$1000\times\min(300\sqrt{2}/(1000\sqrt{2}/2-1)),300\sqrt{2}/(1000(\sqrt{2}/2))=6000$.

FIG. 19 shows vibration generated in a machine if the object passes through or near the point P1 at a speed of 600. More specifically, FIG. 19 shows an acceleration waveform on the Y axis. Since acceleration on the X axis is lower than that of the Y axis, it is omitted therein. In this case, generated mechanical vibration is a maximum of 1.26 m/s$^2$.

As can be seen, according to the conventional art, as shown in FIGS. 15 and 17, even with a slight difference in shape, the magnitude of generated mechanical vibration greatly differs and the mechanical vibration cannot be accurately managed.

Specifically, if the mechanical vibration is limited to not greater than 0.78 m/s$^2$, a permissible speed difference should be set at half the current permissible speed difference, i.e., 150√12. If so set, however, the permissible speed of the object on the command path shown in FIG. 15 becomes 150 (at which permissible speed, vibration is 0.39 m/s$^2$). It is obvious that the speed is decreased excessively. In other words, working efficiency is deteriorated.

SUMMARY OF THE INVENTION

It is an object of the present invention to provide a technology for determining the permissible speed of an object and controlling the speed of the object based on the calculated permissible speed.

According to the method and apparatus for determining a permissible speed of the object of the present invention, command path and command speed within a predetermined range is read and a speed command for each time is calculated based on the read command path and the command speed. Subsequently, a frequency band component that corresponds to mechanical vibration due to the movement of the object and which is included in a speed command for the each time is calculated and a permissible speed at which the frequency band component becomes equal to or smaller than a preset reference value is calculated. The predetermined range may be a time required for the object to move along the command path from the specific point or the specific region or a distance for which the object moves along the command path from the specific point or the specific region.

According to the apparatus of the present invention, the moving speed of the object is controlled such that the speed does not exceed the permissible speed calculated as mentioned above.

These and other objects, features and advantages of the present invention are specifically set forth in or will become apparent from the following detailed descriptions of the invention when read in conjunction with the accompanying drawings.

DETAILED DESCRIPTIONS

The embodiments of the permissible speed decision method and the speed control apparatus according to the present invention will be explained hereinafter in detail with reference to the drawings. It should be noted that the present invention is not limited by these embodiments.

Figure 1:
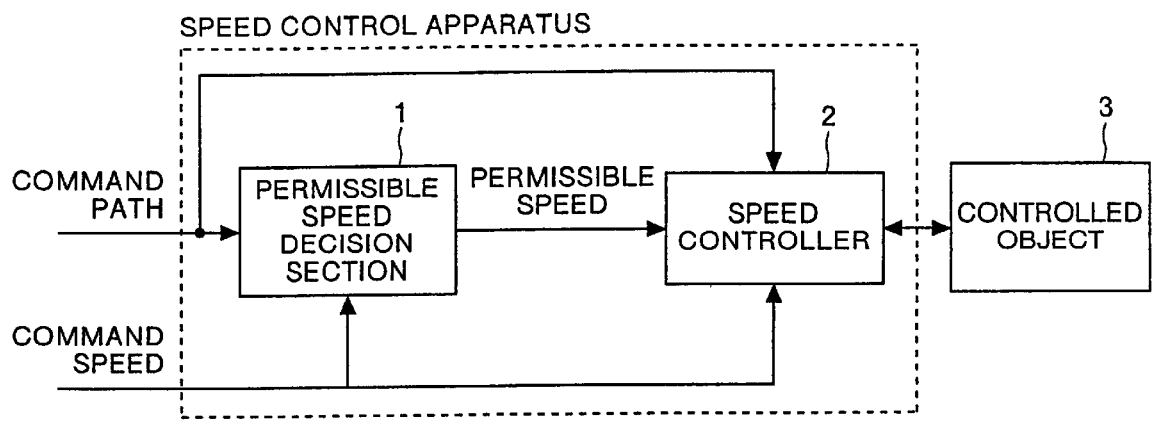
FIG. 1 is a block diagram which shows the configuration of a speed control apparatus according to the present invention.

FIG. 1 is a block diagram which shows the configuration of a speed control apparatus according to the present invention. In FIG. 1, reference symbol 1 denotes a permissible speed decision section, 2 denotes a speed controller, and 3 denotes an object that moves. The speed control apparatus is comprised of the permissible speed decision section 1 and the speed controller 2. The permissible speed decision section 1 determines a permissible speed in accordance with a permissible speed decision method according to the present invention. In the first embodiment, the permissible speed is determined based on a command path and a command speed. The speed controller 2 controls the speed of the object 3 along the command path. The speed controller 2 controls the speed of the control object so as not to exceed the command speed and the permissible speed.

Figure 2:
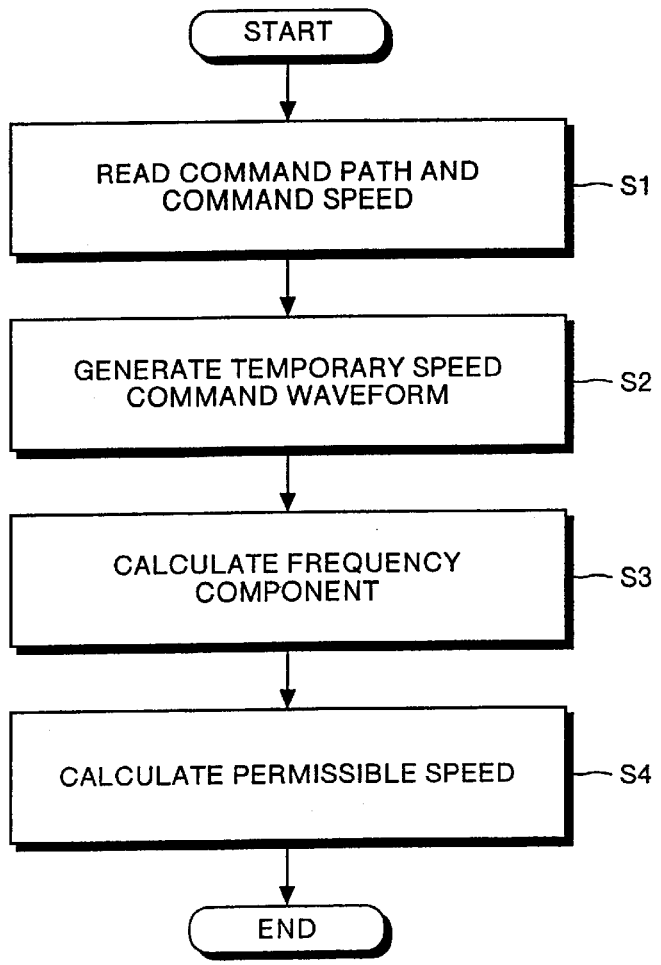
FIG. 2 is a flow chart which shows a permissible speed decision method in a first embodiment of the present invention.

The permissible speed decision method in the first embodiment will next be explained. FIG. 2 is a flow chart which shows the permissible speed decision method in the first embodiment which is realized by the permissible speed decision section 1 of the speed control apparatus according to the present invention. The permissible speed decision method in the first embodiment will be concretely explained, referring again to the examples shown in FIGS. 15 and 17.

Figure 15:
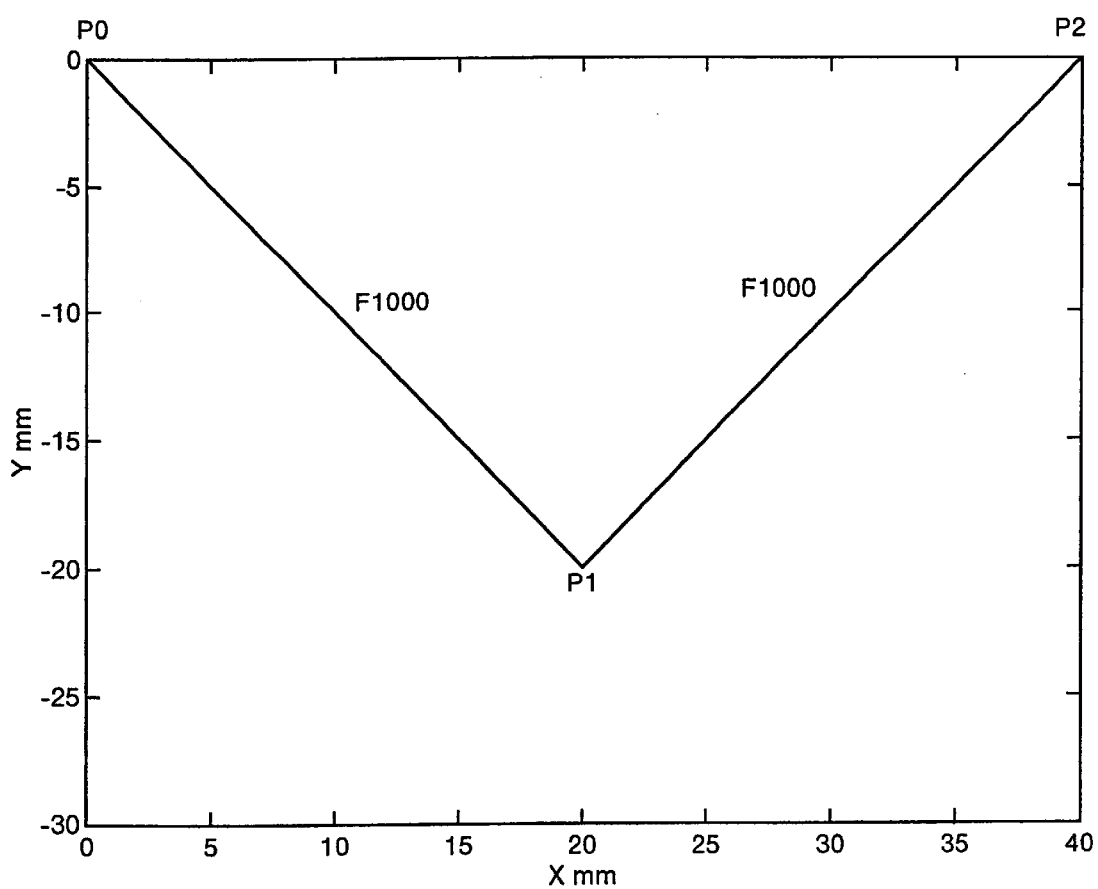
FIGS. 15, 16, 17, 18, and 19 are views that explain problems in the conventional art.
Figure 16:
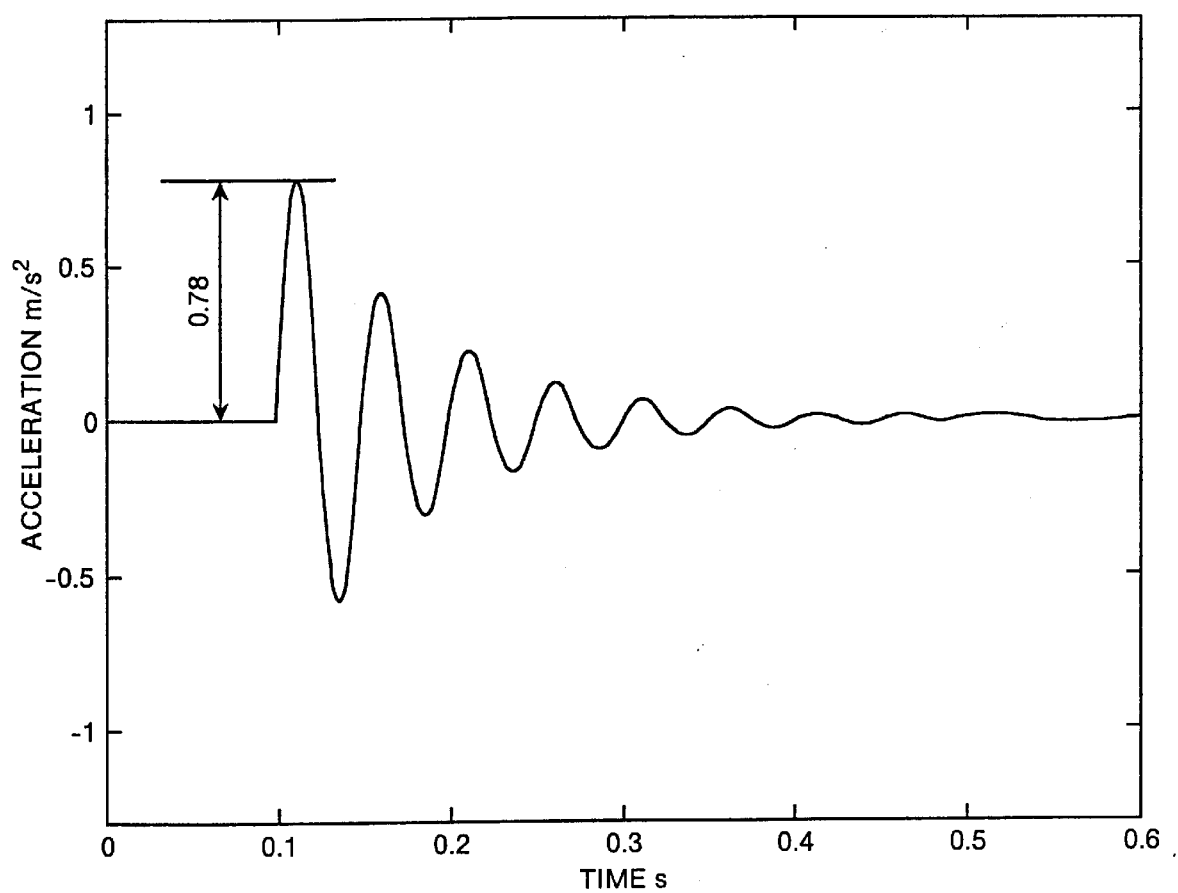

An instance when the control target 3 operates in accordance with a command path and a command speed as shown in FIG. 15 will first be explained. In this case, a permissible speed at a point P1 is determined. The permissible speed decision section 1 of the speed control apparatus reads the command path and the command speed (at a step S1). At the step S1, the permissible speed decision section 1 reads such a command path and a command speed within a range of predetermined time or a predetermined distance including the point P1.

Figure 3:
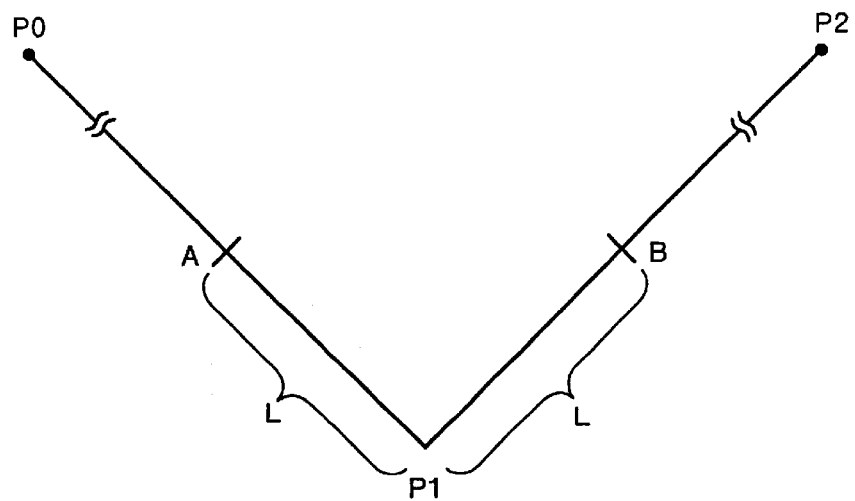
FIG. 3 is a view which shows one example of when a command path and a command speed are read.

FIG. 3 shows one example of when the permissible speed decision section 1 reads the command path and the command speed within a range of a distance L. In this example, the permissible speed decision section 1 reads the command path and the command speed within ranges of distances L in a forward direction and a backward direction (which are a range from A to P1 and that from P1 to B along the command path shown in the figure), respectively.

It is noted that the range for reading the command path and the command speed may be set to fall within a range of predetermined time or may be set based on both time and distance. For example, if a distance from the point P1 along the command path is set at d, time from the point P1 (time required) can be obtained as "time=d/command speed". The command path and the command speed are normally defined by an operation program. Therefore, a command path and a command speed prior to the point P1 (past) are stored and those after the point P1 (future) are read in advance. In addition, it is preferable that the predetermined time is not shorter than a quarter of the cycle of the mechanical vibration so as to extract the component of a mechanical vibration frequency more accurately. It is also preferable that the predetermined distance is set at not smaller than a quarter of a product between the mechanical vibration frequency and a command feed speed for the same reason explained above.

Figure 4:
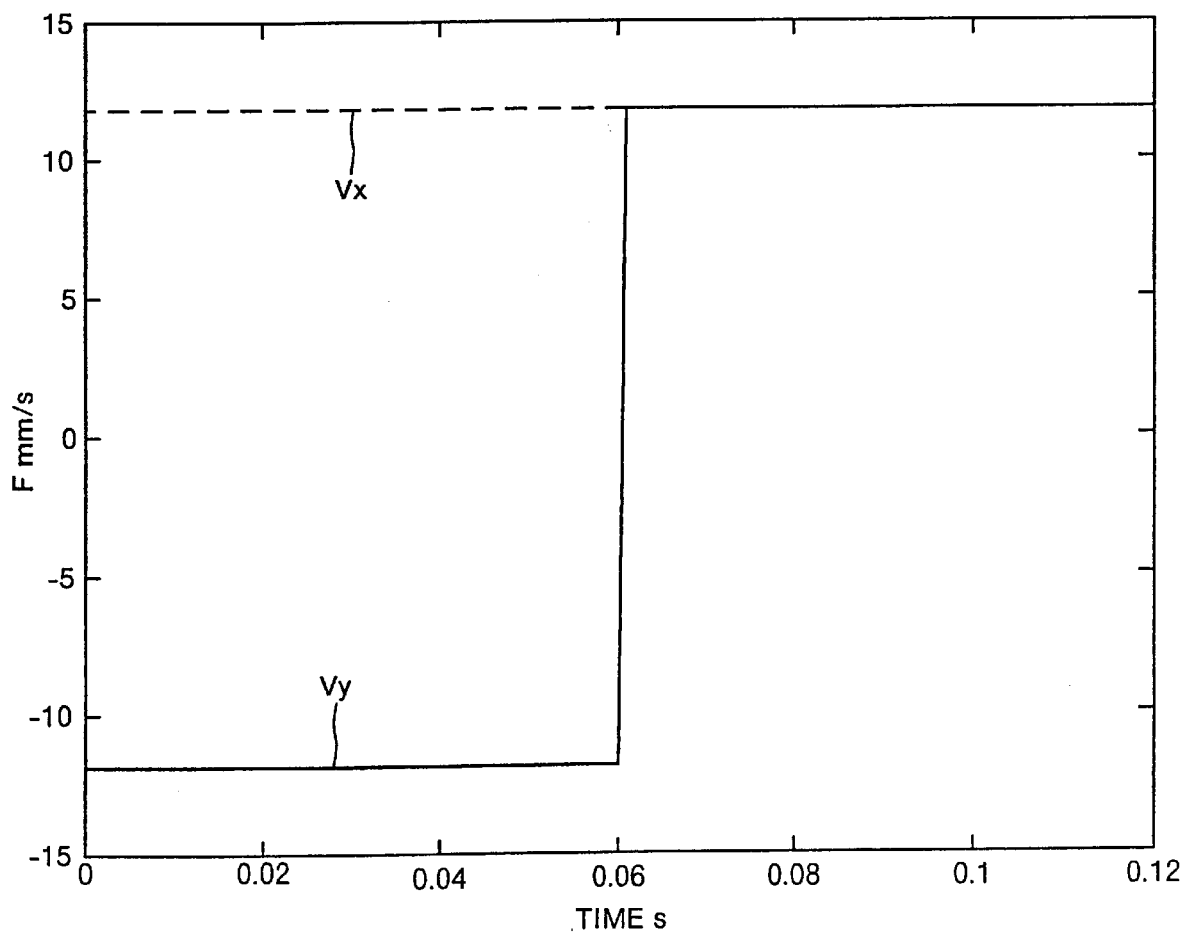
FIG. 4 is a view which shows one example of speed command waveforms on respective axes.

After reading the command path and the command speed, the permissible speed decision section 1 generates a speed command at each time (speed command waveform) from the permissible speed which is calculated based on the respective commands (at a step S2). FIG. 4 is a view which shows speed command waveforms on the X and Y axes in case of FIG. 3. In FIG. 4, reference symbol Vx denotes a speed command waveform on the X axis and Vy denotes that on the Y axis. If the angle of a segment to the X axis is set at θ and the command speed is set at F then speeds on the respective axes in the respective blocks can be expressed by the following equations (1) and (2). This arithmetic operation is performed over the entire range which is determined at the step S1.

$$Vx = F \times \cos\theta \quad (1)$$

$$Vy = F \times \sin\theta \quad (2).$$

Figure 5:
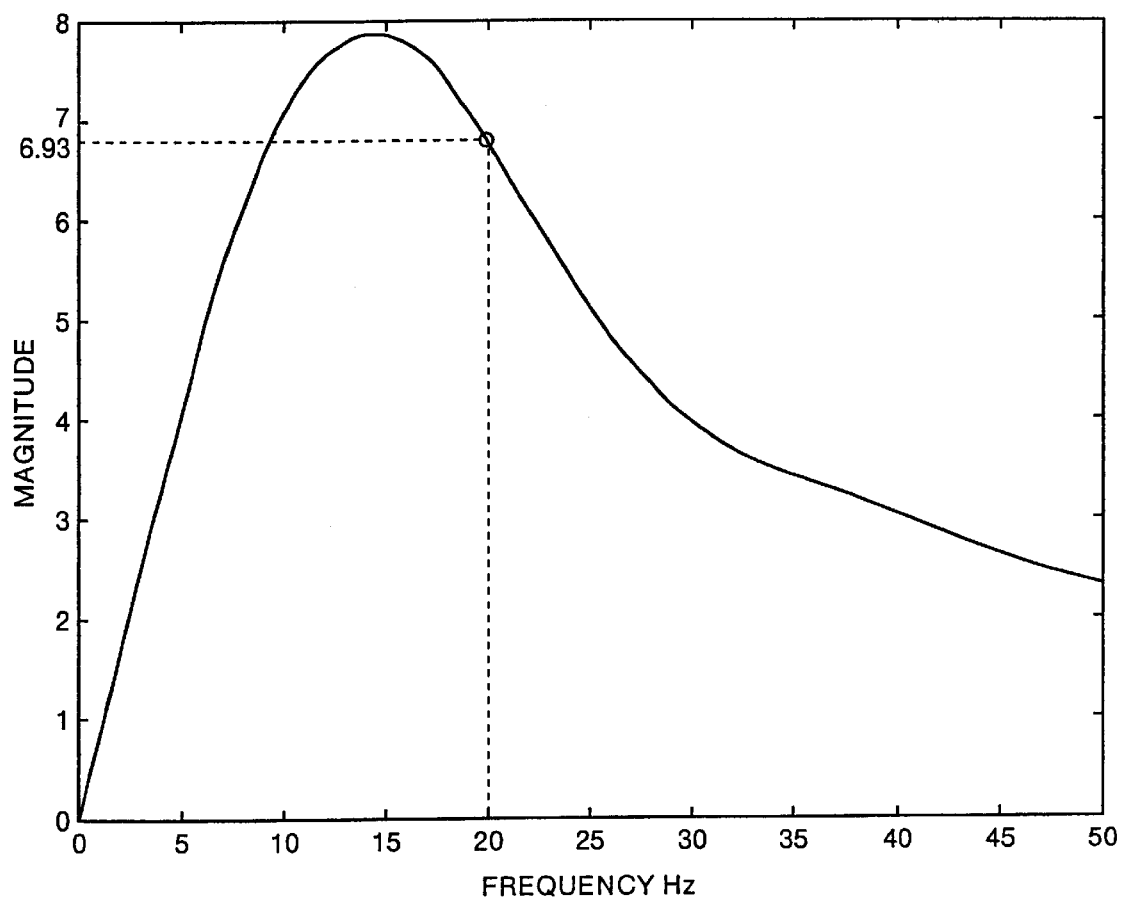
FIG. 5 is a view which shows one example of a spectrum that corresponds to a speed command waveform.

After generating the speed command waveforms on the respective axes, the permissible speed decision section 1 obtains a frequency component that corresponds to mechanical vibration (at a step S3). Here, discrete fast Fourier transform (FFT) is performed to the speed command waveform Vy which is obtained at the step S2 to provide the spectrum of the speed command waveform Vy. FIG. 5 is a view which shows a spectrum that corresponds to the speed command waveform Vy. In this case, the magnitude G of the frequency component (denoted by o mark) that corresponds to the mechanical vibration is 6.93.

After obtaining the frequency component that corresponds to the mechanical vibration, the permissible speed decision section 1 obtains a permissible speed using the magnitude G of the frequency component and a reference value Vmax (which is set herein at 2.079) by the following equation (3) (at a step S4):

$$\begin{aligned} \text{Permissible speed} &= \text{command speed} \times V\text{max}/G \quad (3).\\ &= 1000 \times 2.079/6.93 \\ &= 300 \end{aligned}$$

Figure 6:
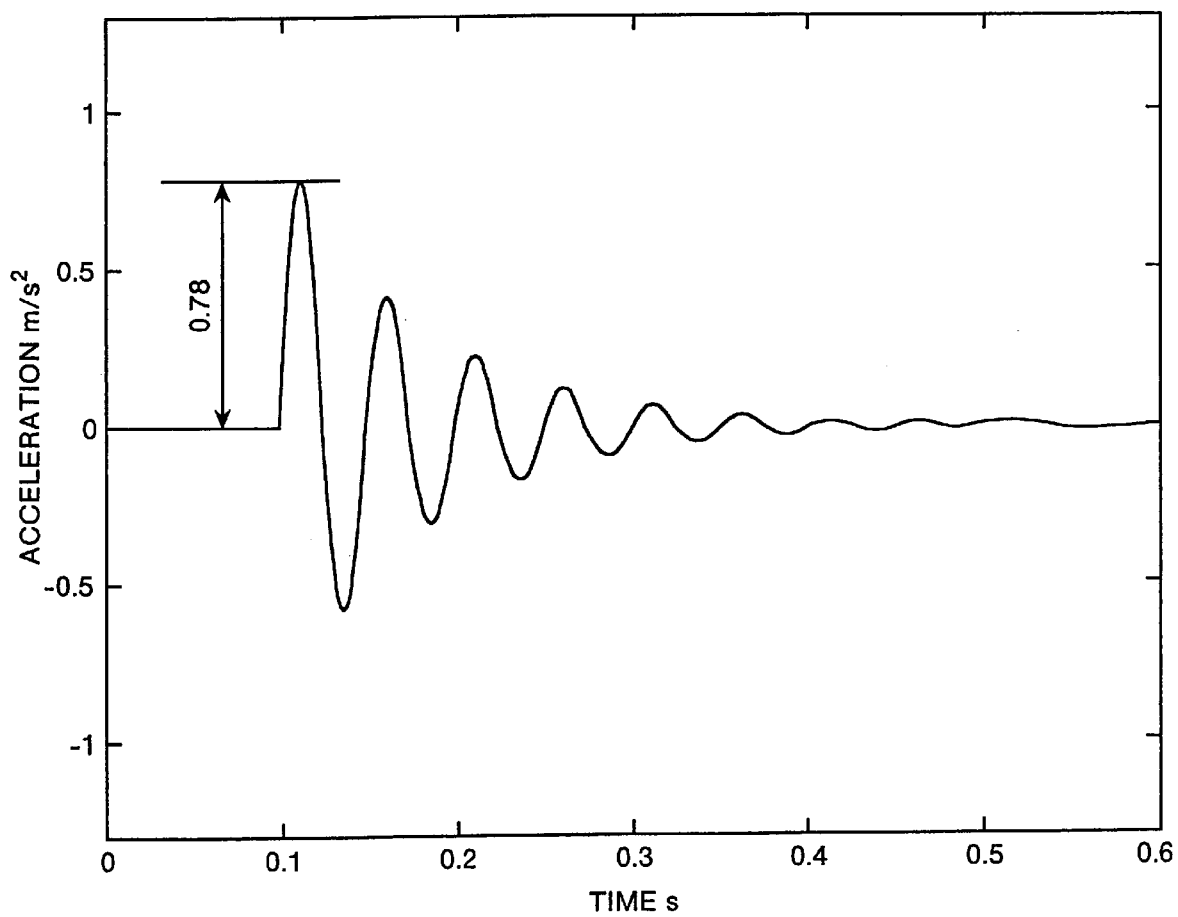
FIG. 6 is a view which shows one example of a vibration which is generated in a machine.

FIG. 6 is a view which shows vibration which is generated in a machine if the object passes through near the point P1 at a speed of 300. More specifically, FIG. 6 shows an acceleration waveform on the Y axis. As seen in FIG. 6, generated mechanical vibration is a maximum of 0.78 m/s$^2$.

Figure 7:
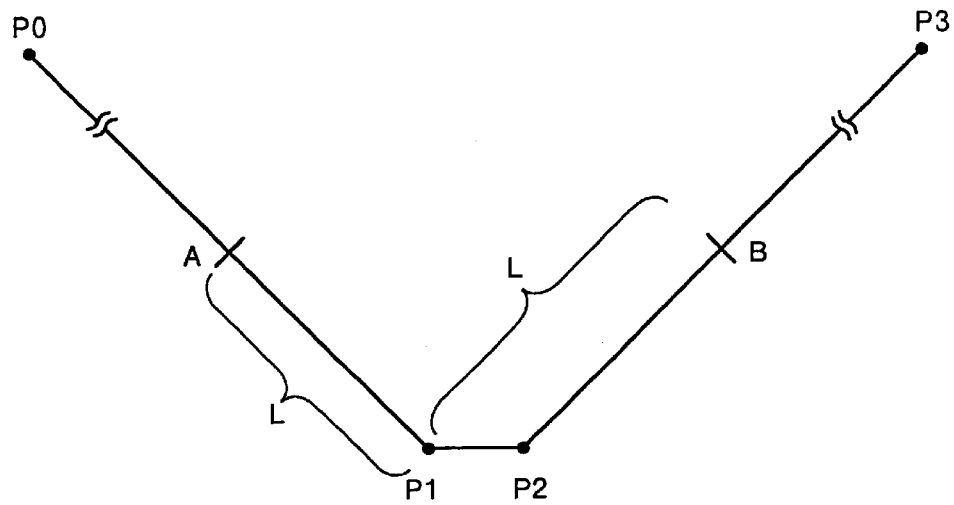
FIG. 7 is a view which shows one example of when a command path and a command speed are read.
Figure 8:
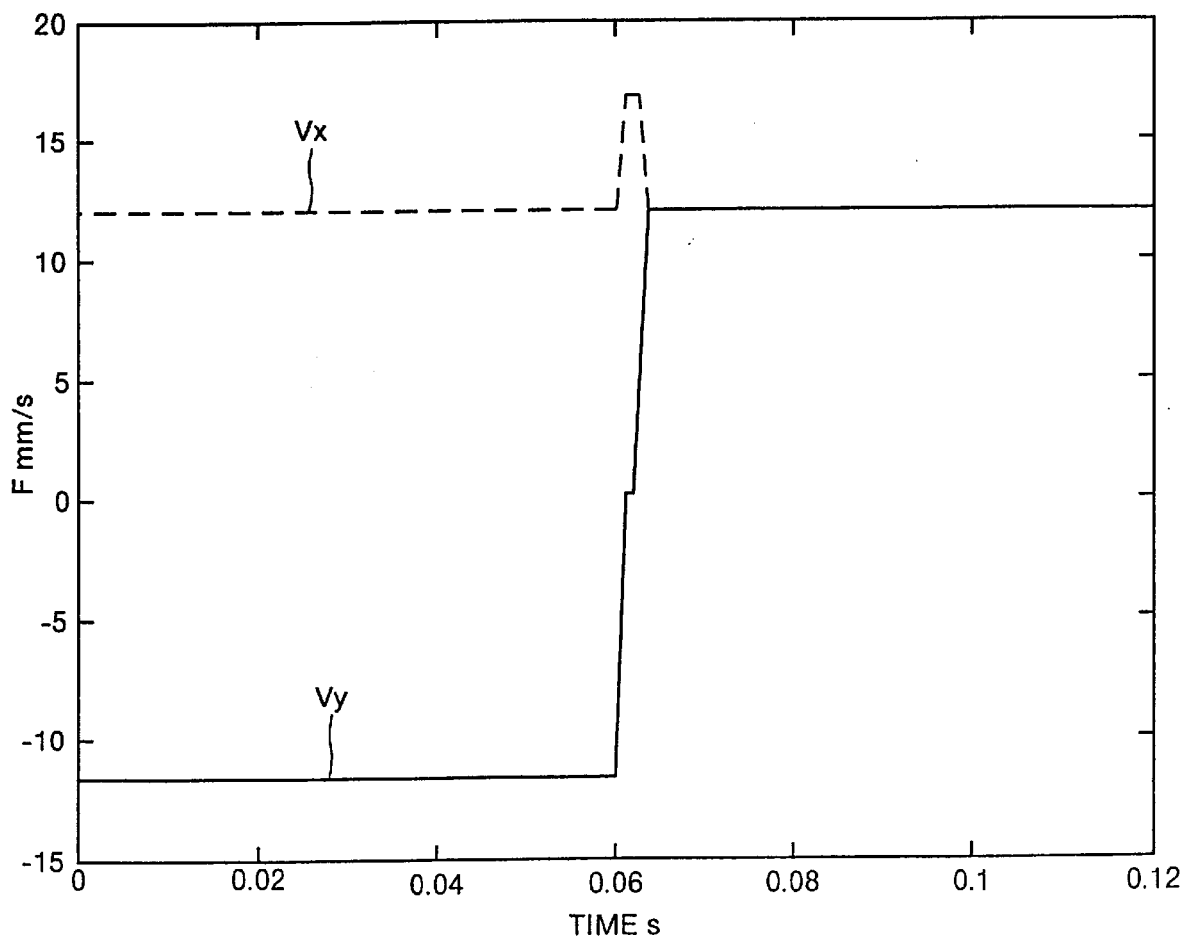
FIG. 8 is a view which shows one example of speed command waveforms on respective axes.
Figure 17:
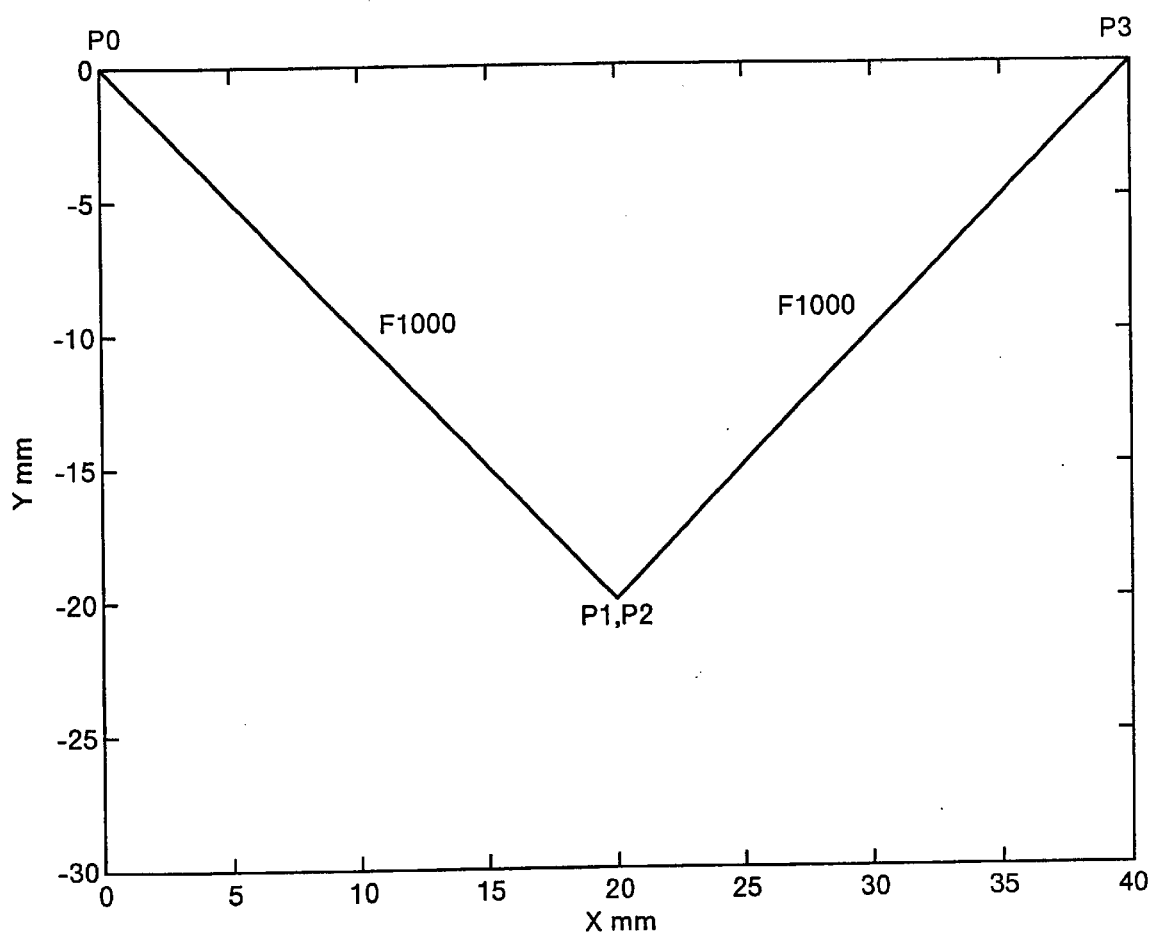
Figure 18:
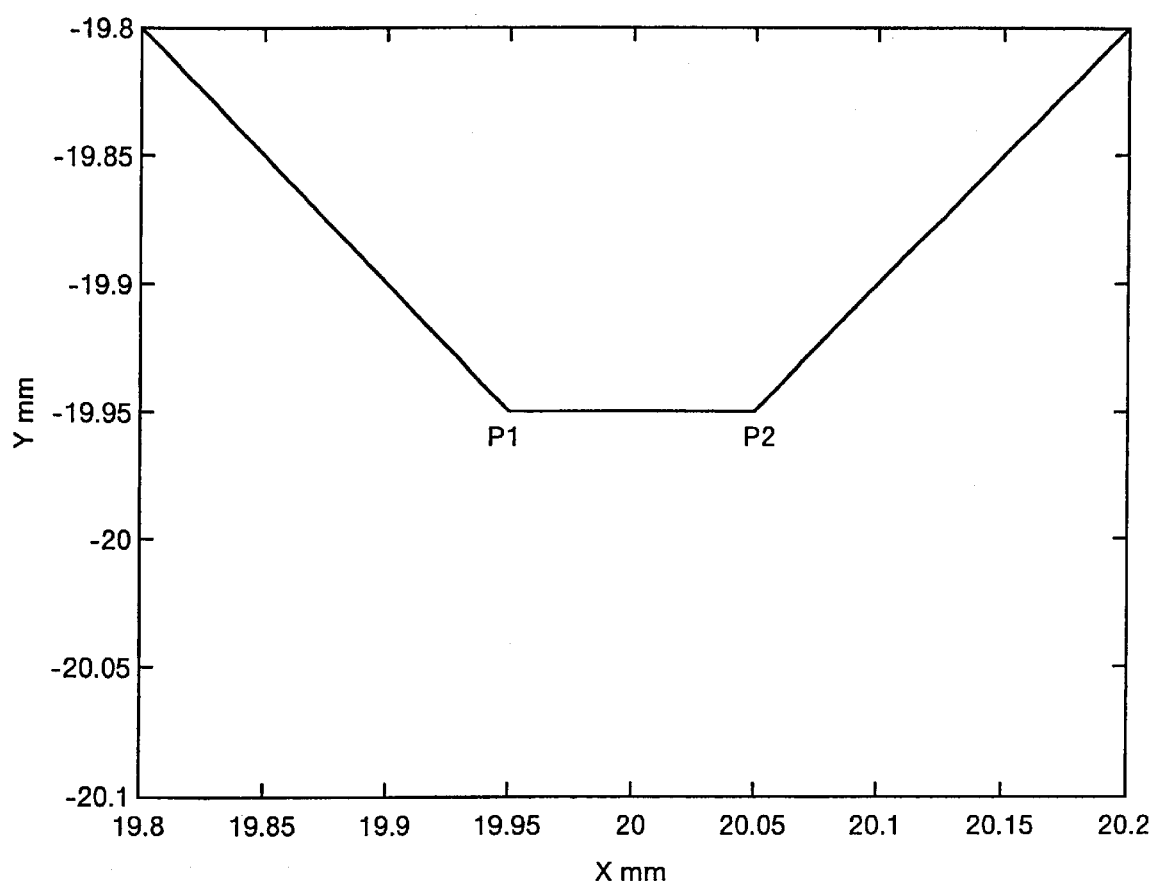
Figure 19:
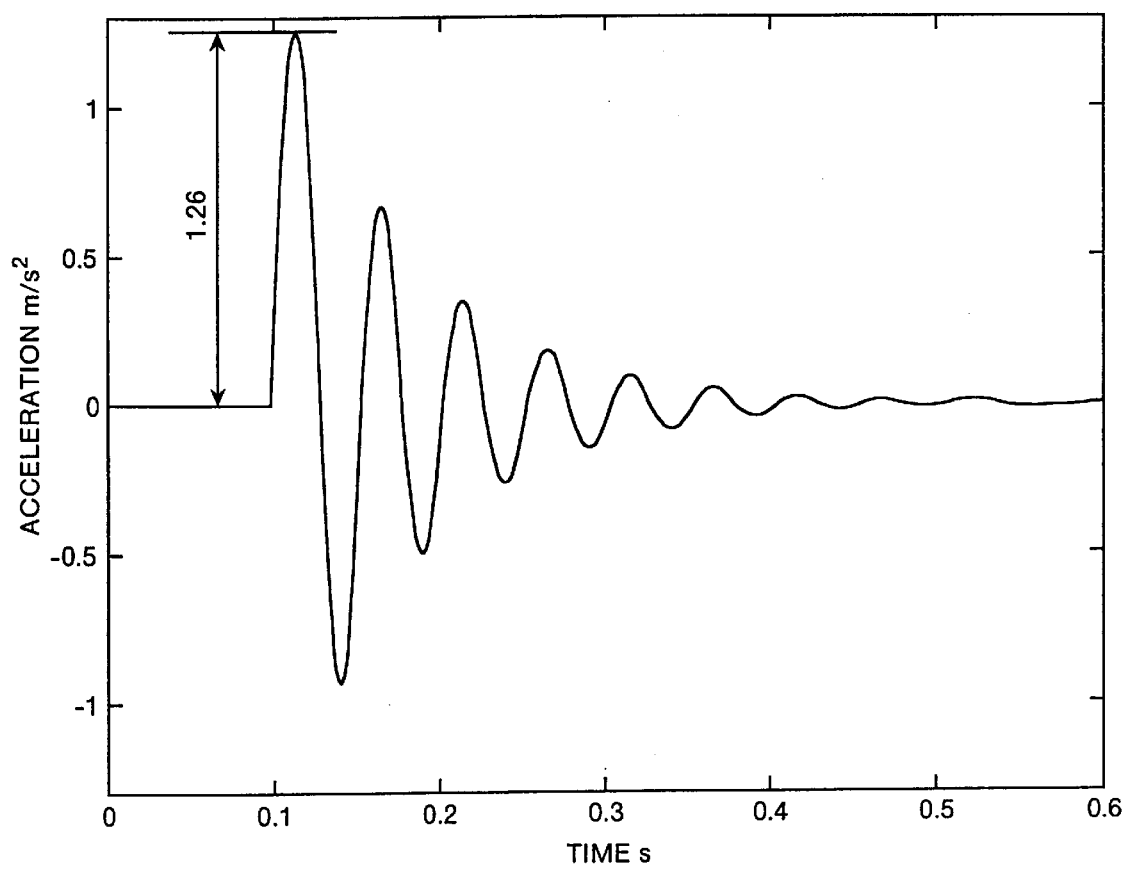

An instance when the control target operates in accordance with a command path and a command speed as shown in FIG. 17 will next be explained. In this case similar to the above case, the speed control apparatus reads the command path and the command speed (at the step S1). FIG. 7 shows one example of when the command path and the command speed fall within a range of a distance L. In this example, the command path and the command speed are read within ranges of distances L from the point P1 in a forward direction and a backward direction along the command path (which are a range from A to P1 and that from P1 to B along the command path shown in FIG. 7), respectively. Speed command waveforms are then generated based on the respective commands (at the step S2). FIG. 8 is a view which shows speed command waveforms on the X and Y axes which are obtained at the step S2.

Figure 9:
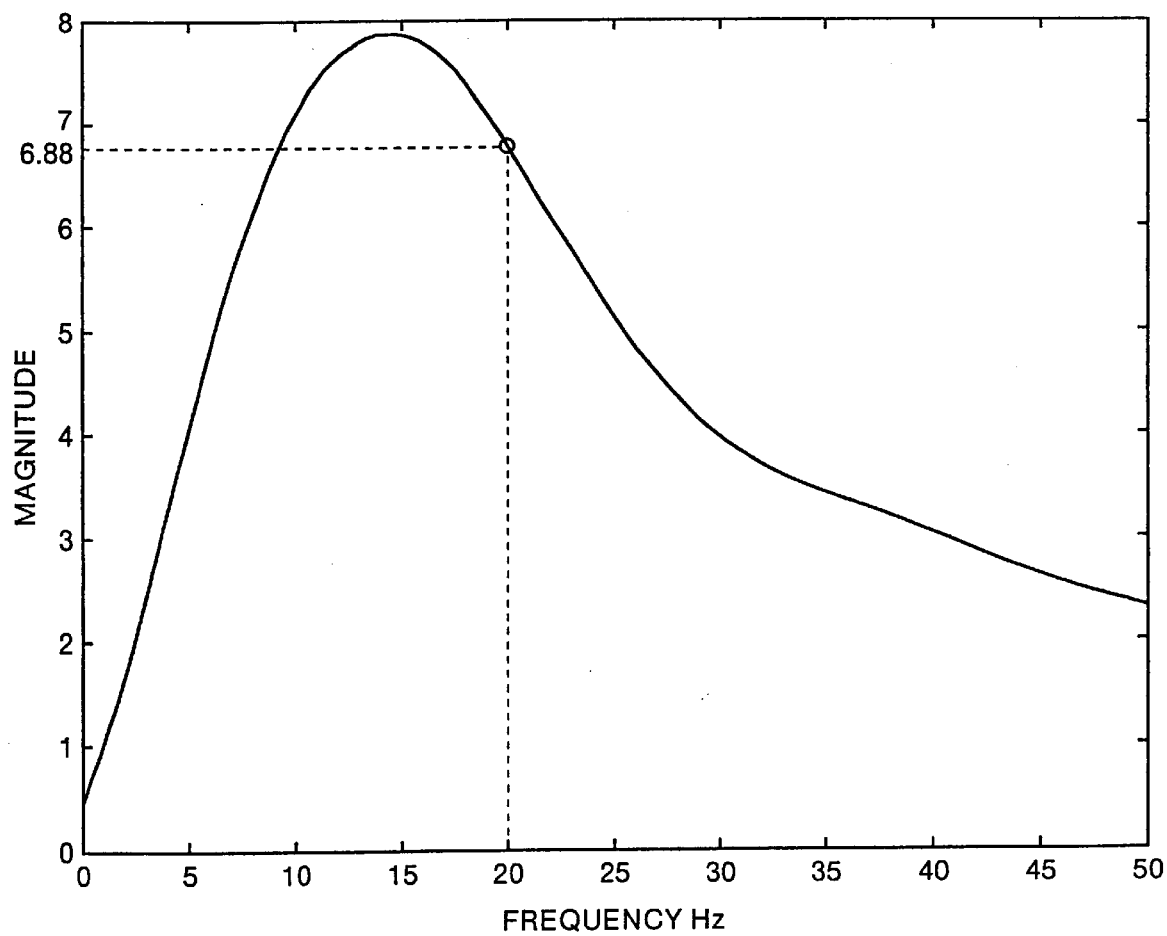
FIG. 9 is a view which shows one example of a spectrum that corresponds to a speed command waveform.

After generating the speed command waveforms of the respective axes, the speed control apparatus obtains a frequency component that corresponds to mechanical vibration (at the step S3). Similarly to the above, an FFT operation (discrete fast Fourier transform) is conducted to the speed command waveform Vy to provide the spectrum of the waveform Vy. FIG. 9 is a view which shows a spectrum that corresponds to the speed command waveform Vy. In this case, the magnitude G of the frequency component (denoted by o mark in FIG. 9) that corresponds to the mechanical vibration is 6.88.

After obtaining the frequency component that corresponds to the mechanical vibration, the speed control apparatus obtains a permissible speed using the magnitude G of the frequency component and the reference value Vmax (which is set herein at 2.079) by the following equation (4) (at a step S4):

$$\begin{aligned} \text{Permissible speed} &= \text{command speed} \times V\text{max}/G \quad (4).\\ &= 1000 \times 2.079/6.88 \\ &= 302 \end{aligned}$$

Figure 10:
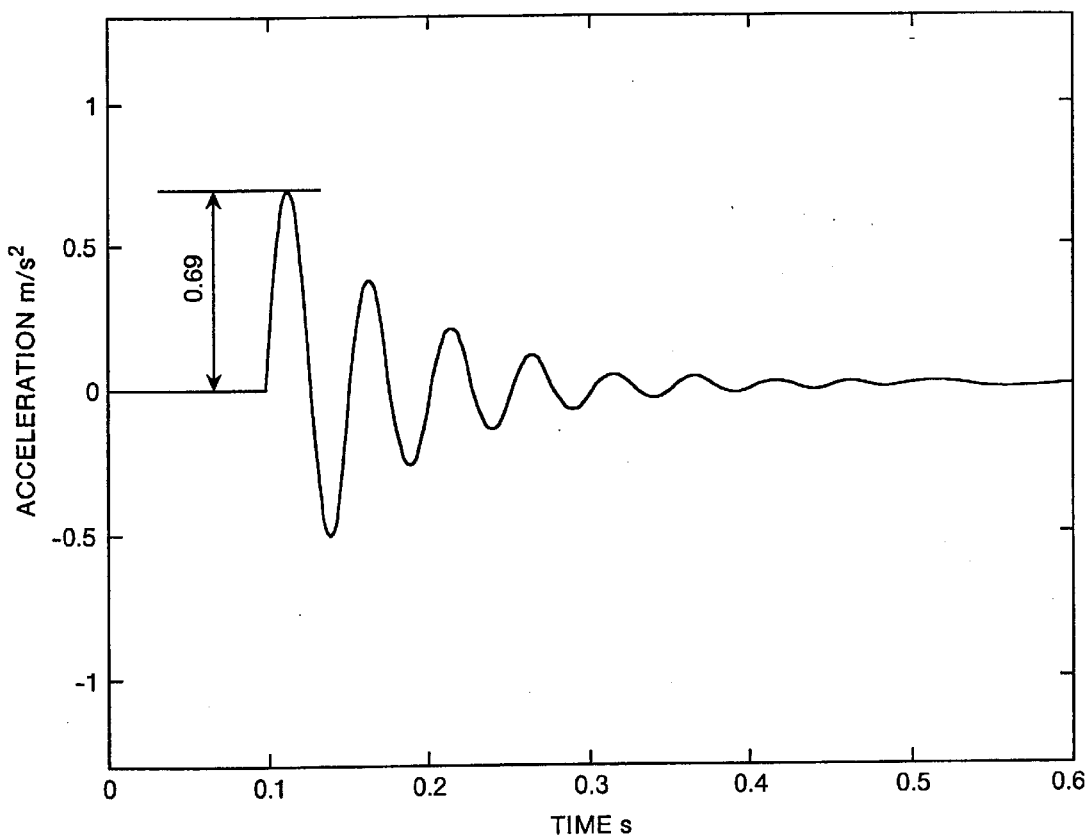
FIG. 10 is a view which shows one example of a vibration which is generated in a machine.

FIG. 10 is a view which shows vibration which is generated in a machine when the object passes through near the point P1 at a speed of 302. More specifically, FIG. 10 shows an acceleration waveform on the Y axis. As seen in FIG. 10, generated mechanical vibration is a maximum of 0.69 m/s$^2$.

As can be understood from the above, in this embodiment, the permissible speed is obtained based on the frequency component that corresponds to the mechanical vibration. It is, therefore, possible to manage the mechanical vibration with high accuracy and thereby realize smooth operation without a shock. Compared with the conventional art, it is possible to reduce operating time without excessively decelerating the speed.

At the step S2, the speed command waveforms on the respective axes are obtained while the command speed of near the point for which the permissible speed is obtained is set at the fixed command speed F. Alternatively, the speed command waveforms on the respective axes may be generated while taking into account of acceleration and deceleration when acceleration and deceleration occur halfway along the blocks. Later calculation accuracy can be, thereby, improved. Alternatively, the speed waveforms on the respective axes of the machine may be estimated from the speed command waveforms on the respective axes using the response characteristic of a servo system. Later calculation accuracy can be, thereby, improved.

At the step S2, the command speed waveforms are generated. Alternatively, not the speed command but positions, acceleration and jerk may be calculated to obtain the frequency component thereof. It is noted that the position can be easily obtained by integrating the speed command and the acceleration and the jerk can be easily obtained by differentiating the speed once or twice, respectively.

At the step S3, the FFT operation is employed. Alternatively, wavelet transform, Laplace transform, a filtering operation using a high-pass/low-pass/band-pass filter or a correlation coefficient operation for correlating the speed command with a predetermined time waveform may be employed. Further, a continuous time region calculation method or a discrete time region calculation method may be applied to the operation result.

In addition, at the step S3, attention is paid to one frequency component. Alternatively, if a plurality of mechanical vibration modes are provided, the number of mechanical vibration frequency changes or the number of mechanical vibration frequency is unknown, then attention may be paid to a plurality of frequency components and a permissible speed may be obtained using the maximum value, the average or the weight average of their frequency components.

At the step S4, the reference value Vmax may be provided for each axis or to be common to all the axes. If the reference value Vmax is provided for each axis, the permissible speed is calculated using the following equation (5) while setting the frequency component of each axis at Gj and the reference value at Vmaxj (j=1, 2, . . . , n (where n is the number of axes)):

Permissible speed=min (Vmax1/G1, Vmax2/G2, . . . , Vmax2/Gn)  (5).

If the respective axes have different mechanical vibration characteristics, more accurate vibration control can be ensured by setting the reference value for each axis. If the reference value is provided to be common to all the axes, the permissible speed is calculated using the following equation (6) or (7) while setting the reference value at Vmax:

Permissible speed=min (Vmax/G1, Vmax/G2, . . . , Vmax/Gn)  (6).

Permissible speed=Vmax√(G1²+G2²+, . . . , Gn²)  (7).

If the difference in mechanical vibration characteristic among the axes is small, it is possible to decrease labor for parameter setting and adjustment by providing a common reference value.

In the first embodiment, the command speed information is employed at the steps S1, S2 and S4. Alternatively, the permissible speed can be calculated without using the command speed. For example, the maximum speed or unit speed which each axis can drive may be used in place of the command speed.

Figure 11:
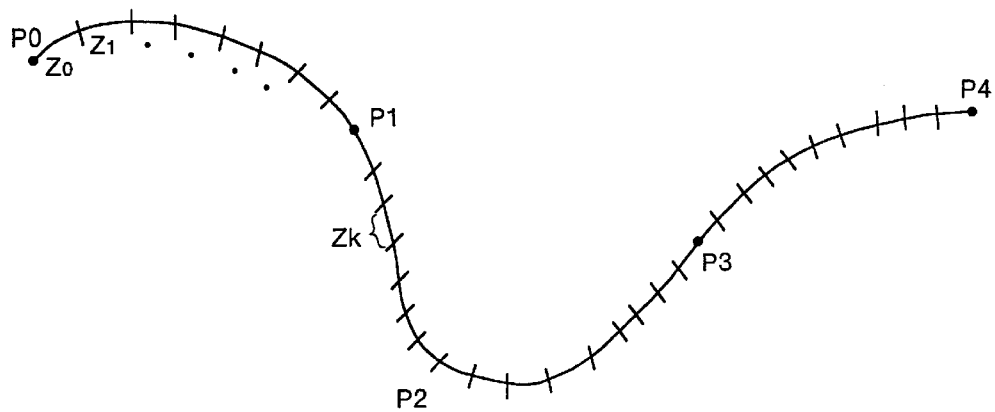
FIG. 11 is a view which shows an instance of obtaining permissible speeds at the start/end points of small regions which are re-divided from blocks.

Moreover, in the first embodiment, the permissible speed at the end point of a certain block is obtained. Alternatively, as shown in, for example, FIG. 11, it is possible to obtain the permissible speeds of the start/end points of small regions (Z0, Z1, . . . , Zk, . . . ) re-divided from blocks. By doing so, even if curvature changes halfway along the blocks as seen in, for example, a spline curve or a NURBS curve, it is possible to ensure more accurate mechanical vibration control.

In addition, in the first embodiment, the permissible speeds at points are obtained. Alternatively, the permissible speed of the entire blocks or that of the entire small regions explained above can be obtained. In this case, at the step S1, a command path and a command speed within a predetermined distance range or a predetermined time range are read before and after the entire blocks or entire small regions.

In the first embodiment, the permissible speed which is inversely proportional to the frequency component G is obtained at the step S4. However, since the permissible speed and the frequency component depend on the shape of a surrounding, they are not always inversely proportional to each other. As a second embodiment, therefore, calculation is repeatedly conducted so as to obtain a more accurate permissible speed. Since a speed control apparatus in the second embodiment is the same as that in the first embodiment as shown in FIG. 1, the same constituent elements are denoted by the same reference symbols, respectively and will not be explained herein.

Figure 12:
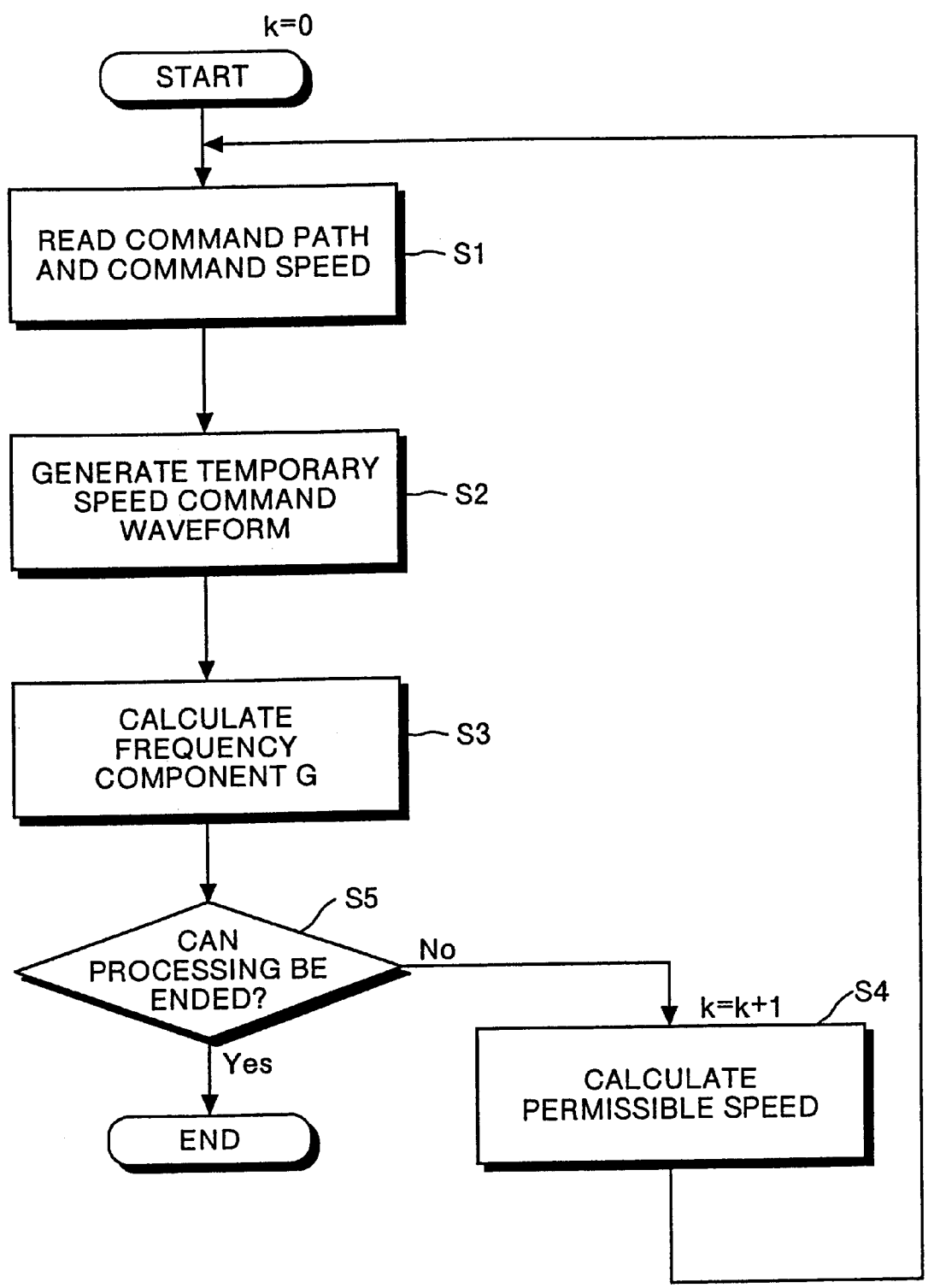
FIG. 12 is a flow chart which shows a permissible speed decision method in a second embodiment of the present invention.

A permissible speed decision method in the second embodiment will be explained. FIG. 12 is a flow chart which shows the permissible speed decision method in the second embodiment which is realized by the permissible speed decision section 1 of the speed control apparatus according to the present invention. The processings at steps S1 to S3 are the same as those shown in FIG. 2.

After obtaining a frequency component that corresponds to mechanical vibration at the step S3, the permissible speed decision section 1 determines whether or not repetition calculation can be ended (at a step S5). If the frequency component is consistent with the reference value thereof, for example, ("Yes" at the step S5), the permissible speed decision section lends the processing. If determining that the repetition calculation cannot be ended ("No" at the step S5), the permissible speed decision section 1 calculates the permissible speed in the same procedures as those at the step S4 in the first embodiment (at a step S4).

As the second processing, the steps S1 to S3 are executed again. In the second processing, the steps S1 to S3 are executed while taking into account of the permissible speed which is obtained at the step S4. Therefore, a calculation result different from that in the first processing is obtained in the second processing.

The permissible speed decision section 1 operates time required from a point for which the permissible speed is calculated as "time=distance/min (command speed, permissible speed)" and a command path and a command speed within this time range are read (at the step S1).

After reading the command path, the command speed and the permissible speed, the permissible speed decision section 1 generates a speed command at each time as in the case of the first embodiment (at the step S2). A frequency component G that corresponds to mechanical vibration is obtained (at the step S3). It is noted that a temporary speed command waveform is generated using a smaller speed out of the command speed and the permissible speed.

Thereafter, the permissible speed decision section 1 ends the processing if the frequency component is sufficiently close to the permissible value thereof, a change in the calculated value of the permissible speed is sufficiently small or the number of times of repetition k is sufficiently large (at a step S5). Specifically, the following conditional expressions (8) to (12) are employed:

|G−Vmax|<ε1  (8)

|G/Vmax−1|<ε2  (9)

|Fa(k)−Fa(k−1)−1|<ε3  (10)

|Fa(k)/Fa(k−1)−1|<ε  (11)

Number of times of repetition>maximum number of times of repetition  (12).

Here ε1 denotes maximum frequency component error, ε2 denotes maximum frequency component change rate, ε3 denotes maximum permissible speed error, ε4 denotes maximum permissible speed change rate and Fa(k) denotes a permissible speed which is obtained at the $k^{th}$ time.

As can be seen, in the second embodiment, the permissible speed can be obtained with higher accuracy by the repetition processing, thereby making it possible to ensure more accurate mechanical vibration control and to shorten working time.

In the first and second embodiments, the mechanical vibration is managed accurately using the permissible speed calculation method which pays attention to the mechanical vibration (at the step S4). In the third embodiment, other characteristic quantities such as trajectory error, speed, acceleration, jerk and speed difference are controlled so as not to exceed their respective permissible values. Since a speed control apparatus in the third embodiment is the same as that in the first embodiment as shown in FIG. 1, the same constituent elements are denoted by the same reference symbols, respectively and will not be explained herein. In addition, the processings other than that at a step S4 in the permissible speed decision method are the same as those in the first and second embodiments.

Figure 13:
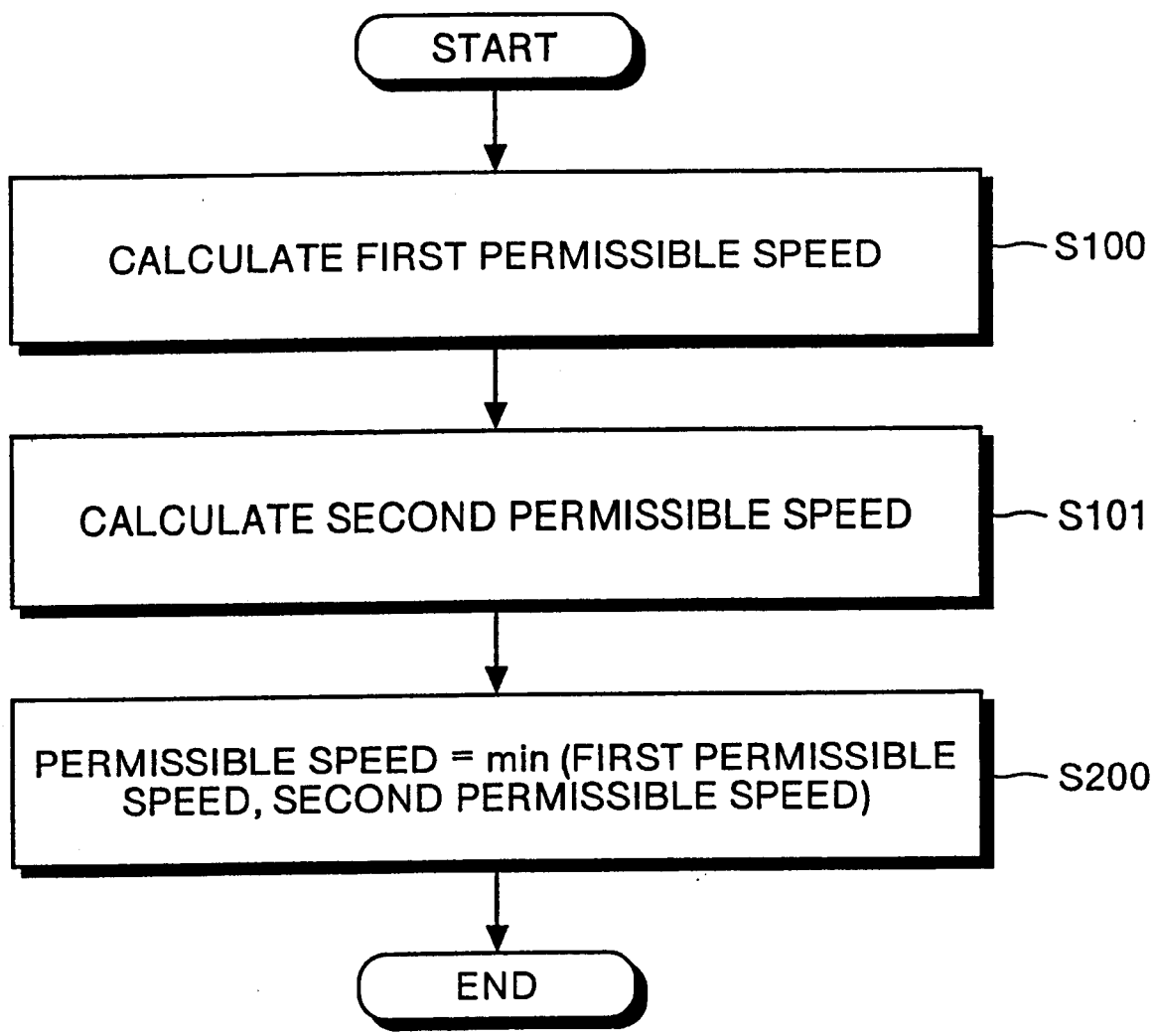
FIG. 13 is a flow chart which shows one example of a permissible speed decision method in a third embodiment of the present invention.

A permissible speed decision method in the third embodiment will be explained. FIG. 13 is a flow chart which shows the permissible speed decision method in the third embodiment which is realized by the permissible speed decision section 1 of the speed control apparatus according to the present invention.

Figure 14:
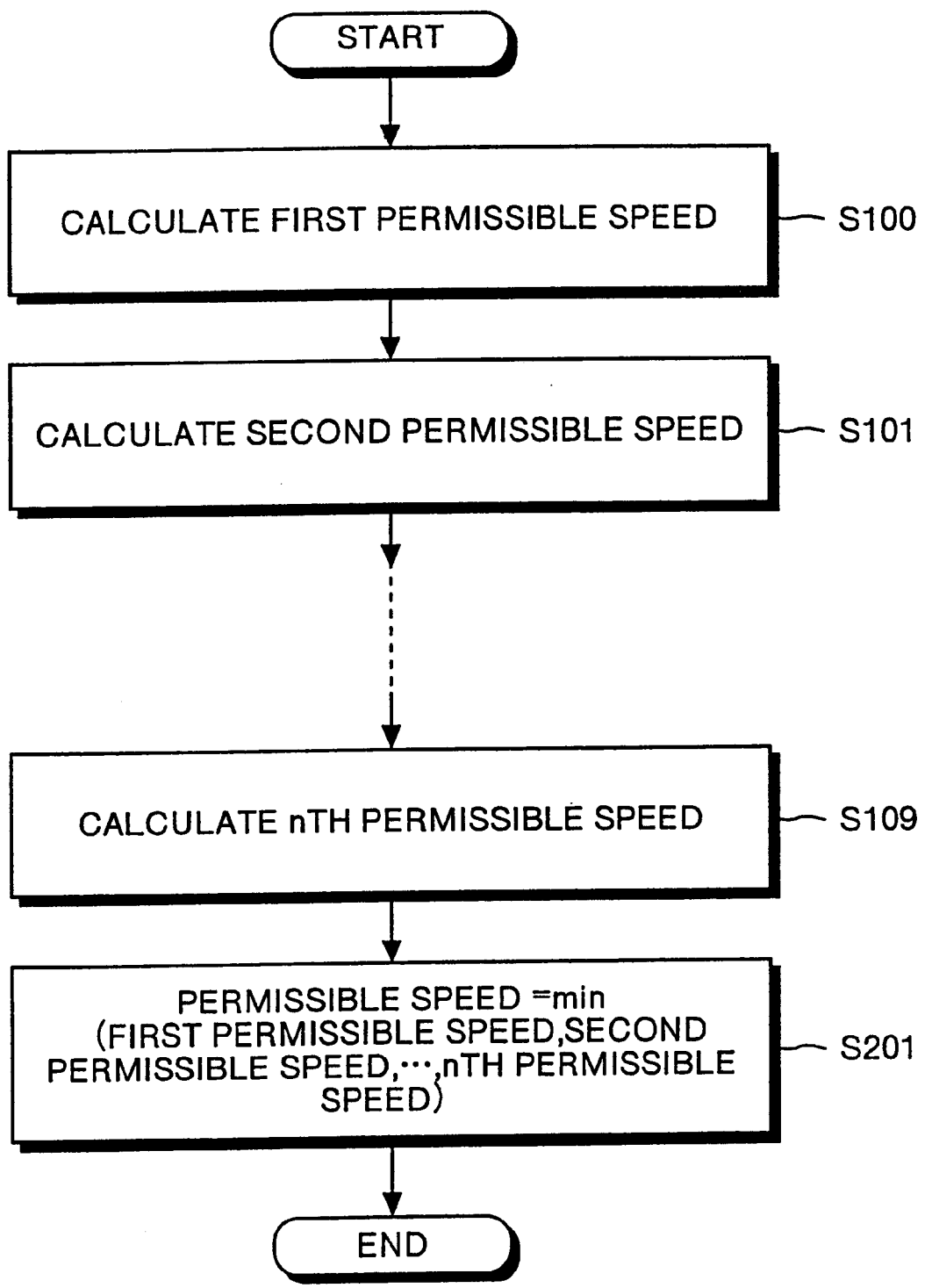
FIG. 14 is a flow chart which shows one example of the permissible speed decision method in the third embodiment.

At the step S4, both a permissible speed calculation method which pays attention to the mechanical vibration (a step S100) and a permissible speed calculation method based on characteristic quantities other than the mechanical vibration (a step S101) are employed. At the step S101, the known method explained in the conventional art is employed, for example. If permissible speeds which are obtained at the steps S100 and S101 are assumed as Fa1 and Fa2, respectively, the permissible speed decision section 1 eventually selects the lower permissible speed as a permissible speed (at a step S200). Alternatively, the order of the steps S100 and S101 may be changed. In addition, as shown in FIG. 14, n permissible speed calculation methods (steps S100, S101, ..., S109 and S201) may be employed. In this case, the order of the first to $n^{th}$ permissible speed calculation methods may be changed.

As can be seen, in the third embodiment, not only the mechanical vibration but also characteristic quantities such as trajectory error, speed, acceleration, jerk and speed difference can be managed.

As explained so far, according to one aspect of the present invention, the permissible speed is obtained based on the frequency component that corresponds to the mechanical vibration. It is, therefore, advantageously possible to manage the mechanical vibration with high accuracy and thereby realize smooth operation without a shock. Compared with the conventional art, it is possible to reduce operating time without excessively decelerating the speed. It is, therefore, advantageously possible to improve processing efficiency.

Moreover, the specific frequency component can be extracted by various methods. It is, therefore, advantageously possible to adaptively manage the mechanical vibration.

Furthermore, even if curvature changes halfway along the blocks as seen in, for example, a spline curve or a NURBS curve, it is advantageously possible to ensure more accurate mechanical vibration control.

Moreover, if the respective axes have different mechanical vibration characteristics, for example, the reference value is set for each axis. It is, therefore, advantageously possible to ensure more accurate vibration control. If the difference in mechanical vibration characteristic among the axes is small, a common reference value is provided. It is, therefore, advantageously possible to decrease labor for parameter setting and adjustment.

Furthermore, the permissible speed can be obtained with higher accuracy by the repetition processing. It is, therefore, advantageously possible to ensure more accurate mechanical vibration control and to shorten working time.

Moreover, it is advantageously possible to manage not only the mechanical vibration but also characteristic quantities such as trajectory error, speed, acceleration, jerk and speed difference.

Furthermore, it is advantageously possible to accurately extract the frequency component of the mechanical vibration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method for determining a permissible feed speed of an object moving along a command path, at a specific part of the command path, the method comprising:

reading command path and command feed speed within a range, the range being one of (i) time required for the object to move along the command path at the command feed speed from the specific part and (ii) distance which the object moves along the command path from the specific part;

generating a tentative speed command waveform based on the command path read and the command feed speed read;

calculating a frequency component that corresponds to mechanical vibration of the object that is included in the tentative speed command waveform; and calculating a permissible feed speed of the object at which the frequency component does not exceed a reference value.

2. The method according to claim 1, wherein, when the frequency component that corresponds to the mechanical vibration of the object is calculated, extracting a specific frequency component by Fourier-transforming the speed command waveform, extracting a specific frequency component by wavelet-transforming the speed command waveform, extracting a specific frequency component by Laplace-transforming the speed command waveform and extracting a specific frequency component by filtering or obtaining, by an arithmetic operation, correlation between the speed command waveform and a reference time waveform.

3. The method according to claim 1, wherein the specific part is a region between specific points, the method including segmenting the region between the specific points.

4. The method according to claim 1, wherein the command path is resolved into components along respective axes, and the reference value is either different or identical for each of the axes.

5. The method according to claim 1, including repeatedly reading the command path and the command speed, generating the speed command, calculating the frequency component, and calculating the permissible feed speed until the frequency component that corresponds to the mechanical vibration becomes sufficiently close to a permissible value, change in the permissible feed speed calculated becomes sufficiently small, or number of repetitions becomes sufficiently large.

6. The method according to claim 1, including determining the permissible feed speed by adding at least one constraint among a trajectory error constraint, a speed constraint, an acceleration constraint, a jerk constraint, and a speed difference constraint.

7. The method according to claim 1, including setting the range, when a time, to be at least equal to one-quarter of a cycle of the mechanical vibration of the object, and setting the range, when a distance, to be at least equal to one-quarter of a product of the cycle of the mechanical vibration of the object and the command speed of the object.

8. A speed control apparatus which controls moving speed of an object, based on a permissible feed speed at a specific part of a command path, the apparatus comprising:

a permissible speed decision unit, the permissible speed decision unit reading the command path and a command feed speed within a range, the range being one of (i) time required for the object to move relative to the specific part and (ii) or distance which the object moves along the command path at the command feed speed from the specific part, generating a tentative speed command waveform based on the command path and the command feed speed, calculating a frequency component that corresponds to mechanical vibration of the object that is included in the tentative speed command waveform, and calculating the permissible feed speed of the object at which the frequency component does not exceed a reference value.

9. The apparatus according to claim 8, wherein, when the frequency component that corresponds to the mechanical vibration of the object is calculated, the permissible speed decision unit extracts a specific frequency component by Fourier-transforming the speed tentative command waveform, extracts a specific frequency component by wavelet-transforming the tentative speed command waveform, extracts a specific frequency component by Laplace-transforming the tentative speed command waveform, and extracts a specific frequency component by filtering or obtains, by an arithmetic operation, correlation between the tentative speed command waveform and a reference time waveform.

10. The apparatus according to claim 8, wherein the specific part is a region between specific points, the method including segmenting the region between the specific points.

11. The apparatus according to claim 8, wherein the command path is resolved into components along respective axis, and the reference value is either different or identical for each of the axes.

12. The apparatus according to claim 8, wherein the permissible speed decision unit repeatedly reads the command path and the command speed, generates the speed command, calculates the frequency component, and calculates the permissible feed speed until the frequency component that corresponds to the mechanical vibration becomes sufficiently close to a permissible value, change in the calculated permissible feed speed becomes sufficiently small, or number of times of repetition becomes sufficiently large.

13. The apparatus according to claim 8, wherein the permissible feed speed decision unit determines the permissible speed by adding at least one constraint among a trajectory error constraint, a speed constraint, an acceleration constraint, jerk constraint, and a speed difference constraint.

14. The apparatus according to claim 8, including setting the range, when a time, to be at least equal to one-quarter of a cycle of the mechanical vibration of the object, and setting the range, when a distance, to be at least equal to one-quarter of a product of the cycle of the mechanical vibration of the object and the command speed of the object.

15. A speed control apparatus that controls moving speed of an object based on permissible feed speed, the apparatus comprising:

a reading unit that reads command path and command feed speed within a range, the range being one of (i) time required for the object to move along a command path relative to a specific part and (ii) distance which the object moves along the command path at the command feed speed from the specific part;

a speed command generation unit that generates tentative speed command waveform based on the command path read and the command feed speed read;

a frequency component calculation unit that calculates a frequency component that corresponds to mechanical vibration of the object that is included in the tentative speed command waveform;

a permissible speed calculation unit that calculates the permissible feed speed of the object at which the frequency component calculated does not exceed a reference value; and an object control unit that controls moving speed of the object so as not to exceed the calculated permissible speed.

16. An apparatus for determining a permissible feed speed of an object moving along a command path, at a specific part of the command path, the method comprising:

a reading unit that reads command path and command feed speed within a range, the range being one of (i) time required for the object to move along the command path from the specific part and (ii) distance which the object moves along the command path from the specific part;

a speed command generation unit that generates a tentative speed command waveform based on the command path read and the command feed speed read;

a frequency component calculating unit that calculates a frequency component that corresponds to mechanical vibration of the object that is included in the tentative speed command waveform; and a permissible speed calculation unit that calculates a permissible feed speed of the object at which the frequency component does not exceed a reference value.

* * * * *